(12) United States Patent
DiZio et al.

(10) Patent No.: US 7,315,418 B2
(45) Date of Patent: Jan. 1, 2008

(54) POLARIZING BEAM SPLITTER ASSEMBLY HAVING REDUCED STRESS

(75) Inventors: James P. DiZio, St. Paul, MN (US); Maureen C. Nelson, West St. Paul, MN (US); Audrey A. Sherman, St. Paul, MN (US); Mieczyslaw H. Mazurek, Roseville, MN (US); Wendi J. Winkler, Minneapolis, MN (US); Jiaying Ma, Maplewood, MN (US); Marvin Jeffrey Case, Georgetown, OH (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 11/095,434

(22) Filed: Mar. 31, 2005

(65) Prior Publication Data

US 2006/0221445 A1    Oct. 5, 2006

(51) Int. Cl.
*G02B 5/30*      (2006.01)

(52) U.S. Cl. ................. 359/500; 359/488; 359/495

(58) Field of Classification Search ........... 359/488, 359/495, 500, 633, 638, 813, 834
See application file for complete search history.

(56) References Cited

U.S. PATENT DOCUMENTS

| | | | |
|---|---|---|---|
| 3,711,176 A | | 1/1973 | Alfrey, Jr. et al. |
| 3,998,524 A | * | 12/1976 | Hubby et al. ............... 359/496 |
| 4,378,392 A | | 3/1983 | Segel |
| 4,519,161 A | | 5/1985 | Gilead et al. |
| 4,679,918 A | | 7/1987 | Ace et al. |
| 5,103,337 A | | 4/1992 | Schrenk et al. |
| 5,453,859 A | * | 9/1995 | Sannohe et al. ............... 349/9 |
| 5,579,138 A | * | 11/1996 | Sannohe et al. ............... 349/96 |
| 5,638,480 A | * | 6/1997 | Ishiharada et al. ........... 385/125 |
| 5,795,047 A | * | 8/1998 | Sannohe et al. ............... 353/81 |
| 5,867,241 A | | 2/1999 | Sampica et al. |
| 5,872,653 A | | 2/1999 | Schrenk et al. |
| 5,882,774 A | | 3/1999 | Jonza et al. |
| 5,946,054 A | * | 8/1999 | Sannohe et al. ............. 348/745 |
| 5,962,114 A | | 10/1999 | Jonza et al. |
| 6,111,700 A | | 8/2000 | Kobayashi et al. |
| 6,157,490 A | | 12/2000 | Wheatly et al. |
| 6,218,679 B1 | * | 4/2001 | Takahara et al. ............... 257/59 |
| 6,246,506 B1 | | 6/2001 | Kobayashi et al. |
| 6,268,458 B1 | | 7/2001 | Soane et al. |
| 6,368,699 B1 | | 4/2002 | Gilbert et al. |
| 6,386,710 B2 | | 5/2002 | Kusano et al. |

(Continued)

FOREIGN PATENT DOCUMENTS

EP        0 523 875        1/1993

(Continued)

OTHER PUBLICATIONS

James P. DiZio et al., "Stabilized Polarizing Beam Splitter Assembly," U.S. Appl. No. 11/096,062, filed Mar. 31, 2005.

(Continued)

*Primary Examiner*—Arnel Lavarias (57) ABSTRACT

A polarizing beam splitter includes a multilayer polarizing film, a first cross-linked silicone gel layer disposed on the multilayer polarizing film, a first rigid cover disposed on the cross-linked silicone gel layer, and a second rigid cover disposed adjacent to the multilayer polarizing film.

21 Claims, 2 Drawing Sheets

U.S. PATENT DOCUMENTS

| | | |
|---|---|---|
| 6,486,997 B1 | 11/2002 | Bruzzone et al. |
| 6,609,795 B2 | 8/2003 | Weber et al. |
| 6,642,991 B2 | 11/2003 | Krum et al. |
| 6,661,482 B2 | 12/2003 | Hara |
| 6,672,721 B2 | 1/2004 | Aastuen et al. |
| 6,760,157 B1 | 7/2004 | Allen et al. |
| 6,811,261 B2 | 11/2004 | Kurumisawa |
| 6,811,841 B1 | 11/2004 | Castiglione et al. |
| 6,829,090 B2 | 12/2004 | Katsumata et al. |
| 6,916,440 B2 | 7/2005 | Jackson et al. |
| 2001/0015612 A1 | 8/2001 | Motomiya et al. |
| 2001/0019452 A1 | 9/2001 | Epstein et al. |
| 2002/0180107 A1 | 12/2002 | Jackson et al. |
| 2002/0190406 A1 | 12/2002 | Merrill et al. |
| 2003/0016334 A1 | 1/2003 | Weber et al. |
| 2003/0048423 A1 | 3/2003 | Aastuen et al. |
| 2003/0071954 A1 | 4/2003 | Krum et al. |
| 2003/0081317 A1* | 5/2003 | Katsumata et al. ......... 359/566 |
| 2003/0191266 A1 | 10/2003 | Inagaki et al. |
| 2004/0043234 A1 | 3/2004 | Hay et al. |
| 2004/0051947 A1* | 3/2004 | Kagawa et al. ............. 359/495 |
| 2004/0066492 A1 | 4/2004 | Nakashima et al. |
| 2004/0086690 A1 | 5/2004 | Hebrink et al. |
| 2004/0099992 A1 | 5/2004 | Merrill et al. |
| 2004/0099993 A1 | 5/2004 | Jackson et al. |
| 2004/0126603 A1 | 7/2004 | Ko et al. |
| 2004/0189907 A1 | 9/2004 | Tominaga |
| 2004/0198924 A1 | 10/2004 | Young et al. |
| 2004/0202879 A1 | 10/2004 | Xia et al. |
| 2004/0209020 A1 | 10/2004 | Castiglione et al. |
| 2004/0227994 A1 | 11/2004 | Ma et al. |
| 2005/0063172 A1 | 3/2005 | Torihara |

FOREIGN PATENT DOCUMENTS

| | | |
|---|---|---|
| EP | 1 211 526 | 6/2002 |
| EP | 1 300 438 | 4/2003 |
| EP | 1 300 700 | 4/2003 |
| JP | 3-120503 | 5/1991 |
| JP | 7005413 | 1/1995 |
| JP | 7084125 | 3/1995 |
| JP | 2002-350643 | 4/2002 |
| JP | 2003-237006 | 8/2003 |
| JP | 2003-253265 | 9/2003 |
| JP | 2004-053685 | 2/2004 |
| JP | 2004-053914 | 2/2004 |
| WO | WO 95/17303 | 6/1995 |
| WO | WO 96/19347 | 6/1996 |
| WO | WO 00/70376 | 11/2000 |
| WO | WO 01/79920 | 10/2001 |
| WO | WO 2004/094142 | 11/2004 |

OTHER PUBLICATIONS

Satas, D., Handbook of Pressure Sensitive Adhesive Technology, 2d. Ed., p. 396 (1989).

* cited by examiner

POLARIZING BEAM SPLITTER ASSEMBLY HAVING REDUCED STRESS

TECHNICAL FIELD

The present disclosure is directed generally to polarizing beam splitters and the use of such devices in, for example, systems for displaying information, and more particularly to projection systems.

BACKGROUND

Optical imaging systems typically include a transmissive or a reflective liquid crystal display (LCD) imager, also referred to as a light valve or light valve array, which imposes an image on a light beam. Transmissive light valves are typically translucent and allow light to pass through. Reflective light valves reflect the input beam into different directions or polarization states in order to form an image.

Many LCD imagers rotate the polarization of incident light. In other words, polarized light is either reflected by the imager with its polarization state substantially unmodified for the darkest state or with a degree of polarization rotation imparted to provide a desired grey scale. A 90° rotation provides the brightest state in these systems. Accordingly, a polarized light beam is generally used as the input beam for LCD imagers. A desirable compact arrangement includes a folded light path between a polarizing beam splitter (PBS) and the imager, wherein the illuminating beam and the projected image reflected from the imager share the same physical space between the PBS and the imager. The PBS separates the incoming light from the polarization-rotated image light. A conventional PBS used in a projector system, sometimes referred to as a MacNeille polarizer, uses a stack of inorganic dielectric films placed at Brewster's angle. Light having s-polarization is reflected, while light in the p-polarization state is transmitted through the polarizer.

SUMMARY

Generally, the present disclosure relates to an apparatus for improving performance of a projection system. In particular, the disclosure is based around an imaging core that includes improved image quality, stability and lifetime of a polarizing beam splitter (PBS).

The present disclosure provides a PBS that includes a crosslinked silicone gel layer disposed between a multilayer polarizing film and a rigid cover. The combination of the crosslinked silicone gel layer disposed between the multilayer polarizing film and the rigid cover can reduce stress-induced birefringence within the PBS assembly. In addition, the combination of the crosslinked silicone gel layer disposed between the multilayer polarizing film and the rigid cover can provide a PBS assembly exhibiting improved image quality and stability, and/or enhanced lifetime.

One embodiment of the present disclosure provides a polarizing beam splitter (PBS) that includes a multilayer polarizing film, a first cross-linked silicone gel layer disposed on the multilayer polarizing film, a first rigid cover disposed on the cross-linked silicone gel layer, and a second rigid cover disposed adjacent to the multilayer polarizing film. In some embodiments, the multilayer polarizing film is a matched z-index multilayer reflective polarizing film and the cross-linked silicone gel includes cross-linked phenylmethylsilicone.

In another embodiment a projection system is disclosed. The projection system includes a light source to generate light, an imaging core to impose an image on generated light from the light source to form image light, and a projection lens system to project the image light from the imaging core. The imaging core includes at least one polarizing beam splitter and at least one imager. The polarizing beam splitter includes a multilayer reflective polarizing film, a first cross-linked silicone gel layer disposed on the multilayer reflective polarizing film and between the light source and the multilayer reflective polarizing film, a first rigid cover disposed on the first cross-linked silicone gel layer, and a second rigid cover disposed adjacent to the multilayer reflective polarizing film.

In a further embodiment, a method of making a polarizing beam splitter is disclosed. The method includes disposing a multilayer reflective polarizing film between a first rigid cover and a second rigid cover. A first cross-linked silicone gel layer is between the multilayer reflective polarizing film and the first cover and a second cross-linked silicone gel layer is between the multilayer reflective polarizing film and the second cover. In some embodiments, silicone is cured to form cross-linked silicone gel layers before disposing a multilayer reflective polarizing film between a first rigid cover and a second rigid cover. In other embodiments, silicone is cured to form cross-linked silicone gel layers after disposing a multilayer reflective polarizing film between a first rigid cover and a second rigid cover.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

The following description should be read with reference to the drawings, in which like elements in different drawings are numbered in like fashion. The drawings, which are not necessarily to scale, depict selected illustrative embodiments and are not intended to limit the scope of the disclosure. Although examples of construction, dimensions, and materials are illustrated for the various elements, those skilled in the art will recognize that many of the examples provided have suitable alternatives that may be utilized.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

Weight percent, percent by weight, % by weight, % wt, and the like are synonyms that refer to the concentration of a substance as the weight of that substance divided by the weight of the composition and multiplied by 100.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a multilayer film" encompass embodiments having one, two or more multilayer films. As used in this specification and the appended claims, the term "or" is generally employed in its sense including "and/or" unless the content clearly dictates otherwise.

This disclosure is generally related to 3M docket No. 60542US002 entitled "STABILIZED POLARIZING BEAM SPLITTER ASSEMBLY," filed on Mar. 31, 2005, and incorporated by reference herein.

The present disclosure is applicable to optical imagers. In particular, the disclosure is based around an imaging core that includes improved image quality, stability and lifetime of a polarizing beam splitter (PBS). The disclosed PBS includes a cross-linked silicone gel layer that improves the image quality, stability and/or lifetime of the PBS.

The PBS of the present disclosure may be used in various optical imager systems. The term "optical imager system" as used herein is meant to include a wide variety of optical systems that produce an image for a viewer to view. Optical imager systems of the present disclosure may be used, for example, in front and rear projection systems, projection displays, head-mounted displays, virtual viewers, heads-up displays, optical computing systems, optical correlation systems, and other optical viewing and display systems.

Figure 1:
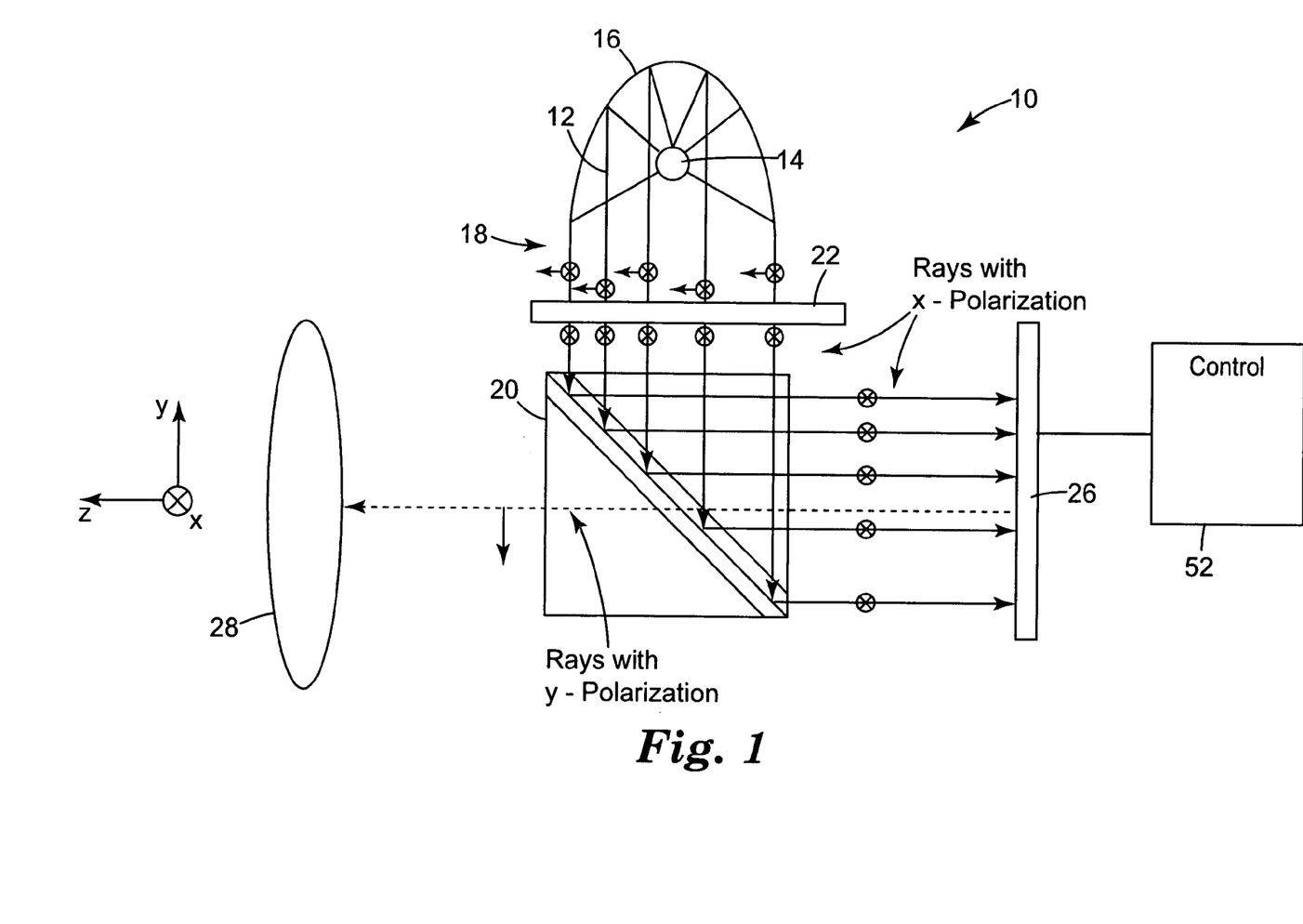
FIG. 1 schematically illustrates an embodiment of a projection unit based on a single reflective imager.

One embodiment of an optical imager system is illustrated in FIG. 1, where system 10 includes a light source 12, for example an arc lamp 14 with a reflector 16 to direct non-polarized light 18 (indicated by the circled x and solid arrow on the light ray) in a forward direction. The light source 12 may also be a solid-state light source, such as light emitting diodes or a laser light source.

The system 10 also includes a PBS 20, e.g., a single or multi-film PBS described below. Light with x-polarization, i.e., polarized in a direction parallel to the x-axis, is indicated by the circled x. Light with y-polarization, i.e., polarized in a direction parallel to the y-axis or z-axis, depending on its direction of propagation, is indicated by a solid arrow. Solid lines indicate incident light, while dashed lines indicate light that has been returned from a reflective imager 26 with a changed polarization state. Light provided by the source 12 can be conditioned by conditioning optics 22 before illuminating the PBS 20. The conditioning optics 22 change the characteristics of the light emitted by the source 12 to characteristics that are desired by the projection system. For example, the conditioning optics 22 may alter any one or more of the divergence of the light, the polarization state of the light, the spectrum of the light. The conditioning optics 22 may include, for example, one or more lenses, a polarization converter, a pre-polarizer, and/or a filter to remove unwanted ultraviolet or infrared light.

The x-polarized components of the light are reflected by the PBS 20 to the reflective imager 26. The liquid crystal mode of reflective imager 26 may be smectic, nematic, or some other suitable type of reflective imager. If the reflective imager 26 is smectic, the reflective imager 26 may be a ferroelectric liquid crystal display (FLCD). The imager 26 reflects and modulates an image beam having y-polarization. The reflected y-polarized light is transmitted through the PBS 20 and is projected by a projection lens system 28, the design of which is typically optimized for each particular optical system, taking into account all the components between the lens system 28 and the imager(s). A controller 52 is coupled to the reflective imager 26 to control the operation of the reflective imager 26. Typically, the controller 52 activates the different pixels of the imager 26 to create an image in the reflected light.

In many instances, the PBS used in various optical imager systems use polymer based multilayer optical film (MOF) such as, for example, multilayer reflective polarizing or matched z-index polarizer films. These constructions are prone to have stress induced birefringence within the PBS assembly. Stress induced birefringence within the PBS assembly reduces image quality of images produced with the PBS assembly. For example, stress induced birefringence within the PBS assembly can reduce the contrast ratio of an image produced by the PBS assembly.

Figure 2:
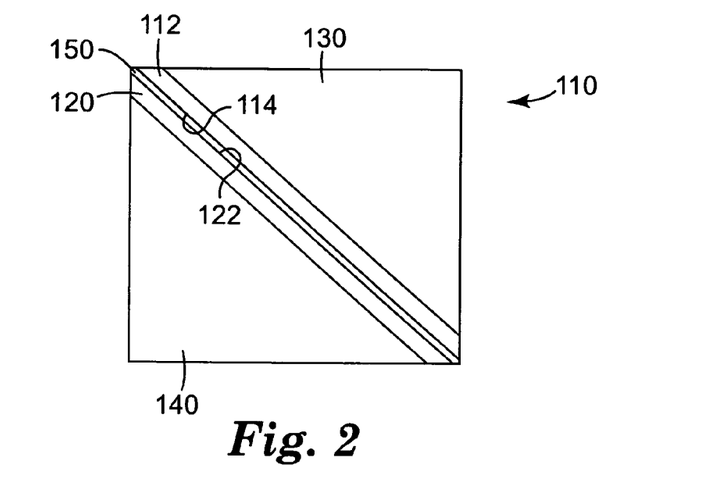
FIG. 2 schematically illustrates an embodiment of a PBS having a multilayer reflective polarizing film.

FIG. 2 illustrates one embodiment of a polarizing beam splitter 110 that utilizes a multilayer polarizing film 150 according to the present disclosure. In this embodiment, polarizing beam splitter 110 includes a multilayer reflective polarizing film 150. The film 150 may be any suitable multilayer reflective polarizing film known in the art. In some embodiments, the film 150 is a matched z-index polarizer film. The illustrated multilayer film 150 has a first surface 114 and a second opposing surface 122.

A cross-linkable or cross-linked silicone gel layer 112 is disposed on the multilayer reflective polarizing film 150 first surface 114 and/or second surface 122. A first rigid cover 130 is disposed on the cross-linkable or cross-linked silicone gel layer 112. A second rigid cover 140 is adjacent to the multilayer reflective polarizing film 150. A second cross-linkable or cross-linked silicone gel layer 120 can be disposed between the second rigid cover 140 and the multilayer reflective polarizing film 150. In some embodiments, the polarizing beam splitter 110 includes two multilayer reflective polarizing films. In other embodiments, the polarizing beam splitter 110 includes three or more multilayer reflective polarizing films. In some embodiments, the polarizing beam splitter 110 includes two or more multilayer reflective polarizing films with cross-linkable or cross-linked silicone gel layer disposed between the multilayer reflective polarizing films.

The first cross-linkable or cross-linked silicone gel layer 112 and second cross-linkable or cross-linked silicone gel layer 120 can have any useful thickness. In some embodiments, first cross-linkable or cross-linked silicone gel layer 112 and the second cross-linkable or cross-linked silicone gel layer 120 can have a thickness in a range from 0.1 to 300 micrometers, or from 0.5 to 150 micrometers, or from 25 to 150 micrometers.

Although depicted as including two prisms 130 and 140, the PBS 110 may include any suitable cover(s) disposed on one or either side of the multilayer reflective polarizing film 150. The prisms 130 and 140 can be constructed from any light transmissive material having a suitable refractive index to achieve the desired purpose of the PBS. The prisms should have refractive indices less than that which would create a total internal reflection condition, i.e., a condition where the propagation angle approaches or exceeds 90° under normal usage conditions (e.g., where incident light is normal to one face of the prism). Such condition can be calculated using Snell's law. In many embodiments, the prisms are made of isotropic materials, although other materials can be used. A "light transmissive" material is one that allows at least a portion of incident light from the light source to transmit through the material. In some applications, the incident light can be pre-filtered to eliminate undesirable wavelengths. Suitable materials for use as prisms include, but are not limited to, ceramics, glass, and polymers. One useful category of glass includes a lead-free glass known as SK5 commercially available from Schott, as described in U.S. Patent Publication 2004-0227994.

The assembly of polymer based multilayer optical film (MOF) to rigid substrates is challenging when it is necessary to meet the environmental and lifetime requirements for useful PBS assemblies. An adhesive or coupler should have good adhesion to the MOF as well as to the rigid substrate, and in addition, not induce stress on the MOF and/or rigid substrate. PBS performance is sensitive to stress, and even very small stress can result in degradation of the PBS performance. The adhesive properties should be balanced with those of the MOF and rigid substrate in order to achieve the maximum stability and lifetime of the PBS assembly. Structural adhesives can shrink during curing and/or cure unevenly, causing stress on the MOF and/or the rigid substrate. It is also possible that not fully cured structured adhesive undergoes gradual curing by light and heat under the normal usage condition, which can decrease the stability of the PBS. Further, many structural adhesives have a tendency to yellow and affect the optical properties of the PBS, after being exposed to high intensity light used with PBS assemblies. This disclosure is based around a PBS assembly that includes a cross-linked silicone gel layer disposed between a multilayer polarizing film and a rigid cover to reduce stress within the PBS.

Silicone gel coupling materials are remarkable in that they can display acceptable light stability, along with an ability to adequately relieve birefringence-inducing stress in a PBS assembly. Silicone gel coupling materials are also structurally stable. Silicone gel coupling materials do not expand or shrink when cured. Silicone gel coupling materials do not discolor of yellow after exposed to high intensity light. Silicone gel coupling materials are easy to handle as they do not flow when placed in a PBS assembly. Even when cured in a PBS assembly, some silicones gel formulations induce minimal stress to the assembly. This is particularly true when using a silicone gel and silicone oil mixture in a PBS assembly.

The cross-linked or cross-linkable silicone gel described herein can be formed of any useful silicone materials such as, for example, dimethylsilicone, diphenylsilicone, or phenylmethylsilicone. In many embodiments, the cross-linked or cross-linkable silicone gel has a refractive index in a range from 1.5 to 1.6 or from 1.5 to 1.58, or from 1.51 to 1.57. In one embodiment, the cross-linked or cross-linkable silicone gel has a refractive index in a range from 1.51 to 1.53. In one embodiment, the cross-linked silicone gel can include phenylmethylsilicone moieties that are cross-linked. In another embodiment, the cross-linked silicone gel can include phenylmethylsilicone moieties which are cross-linked and phenylmethylsilicone oil. In some embodiments, the cross-linked silicone gel includes cross-linked phenylmethylsilicone moieties and phenylmethylsilicone oil in a weight ratio from 1:5 to 5:1, or 1:4 to 4:1, or 1:3 to 3:1. In one embodiment, the cross-linked silicone gel includes cross-linked phenylmethylsilicone moieties and phenylmethylsilicone oil in a weight ratio from 1:3 to 1:1.

In one illustrative embodiment, the uncured silicone includes phenylmethylsilicone having a refractive index of 1.52 at 589 nm, a viscosity of 400 cP and is commercially available under the tradename LS-3252 Encapsulation Gel from Lightspan, LLC (Wareham, Mass.) Upon curing, this cross-linked silicone forms a gel having a Durometer of 10, a specific gravity of 1.07, with a refractive index of 1.52 at 589 nm.

Suitable multilayer reflective polarizing films include, for example, those described in U.S. Pat. No. 5,882,774, which is incorporated by reference herein. One embodiment of a suitable multilayer reflective polarizing film includes alternating layers of two materials, at least one of which is birefringent and oriented. In many embodiments, the multilayer film is formed from alternating layers of isotropic and birefringent material. If the plane of the film is considered to be the x-y plane, and the thickness of the film is measured in the z-direction, then the z-refractive index is the refractive index in the birefringent material for light having an electric vector parallel to the z-direction. Likewise, the x-refractive index is the refractive index in the birefringent material for light having its electric vector parallel to the x-direction, and the y-refractive index is the refractive index in the birefringent material for light having its electric vector parallel to the y-direction. For the multilayer reflective polarizing film, the y-refractive index of the birefringent material can be substantially the same as the refractive index of the isotropic material, whereas the x-refractive index of the birefringent material can be different from that of the isotropic material. If the layer thicknesses are chosen appropriately, the film reflects visible light polarized in the x-direction and transmits light polarized in the y-direction. For a polarizer to have high transmission along its pass axis for all angles of incidence, both the y and z (normal to the film) indices of the alternating layers may be matched. Achieving a match for both the y and z indices may utilize a different material set for the layers of the film than that used when only the y index is matched. 3M multi-layer films, such as 3M brand "DBEF" film, were made in the past with a match of the y indices.

One example of a useful multilayer reflective polarizing film is a matched z-index polarizer film, in which the z-refractive index of the birefringent material is substantially the same as the y-refractive index of the birefringent material. Polarizing films having a matched z-index have been described in U.S. Pat. Nos. 5,882,774 and 5,962,114, and in the following U.S. Patent Publications: 2002-0190406; 2002-0180107; 2004-0099992; and 2004-0099993. Polarizing films having a matched z-index are also described in U.S. Pat. No. 6,609,795 which is incorporated by reference herein.

The z index mismatch is irrelevant for the transmission of nominally s-polarized light. By definition, nominally s-polarized light does not sense the z-index of refraction of a film. However, as described in co-assigned U.S. Pat. No. 6,486,997, the reflective properties of birefringent multilayer polarizers at various azimuthal angles are such that projection system performance is superior when the PBS is configured to reflect x-polarized (approximately s-polarized) light and transmit y-polarized (approximately p-polarized) light. The optical power or integrated reflectance of a multilayer optical film is derived from the index mismatch within an optical unit or layer pair, although more than two layers may be used to form the optical unit. The use of multilayer reflective films including alternating layers of two or more polymers to reflect light is known and is described, for example, in U.S. Pat. No. 3,711,176; U.S. Pat. No. 5,103,337; WO 96/19347; and WO 95/17303. The placement of this optical power in the optical spectrum is a function of the layer thicknesses. The reflection and transmission spectra of a particular multilayer film depends primarily on the optical thickness of the individual layers, which is defined as the product of the actual thickness of a layer and its refractive index. Accordingly, films can be designed to reflect infrared, visible, or ultraviolet wavelengths $\lambda_M$ of light by choice of the appropriate optical thickness of the layers in accordance with the following formula:

$$\lambda_M = (2/M)*D_r$$

wherein M is an integer representing the particular order of the reflected light and $D_r$ is the optical thickness of an optical repeating unit, which is typically a layer pair including one layer of an isotropic material and one layer of an anisotropic material. Accordingly, $D_r$ is the sum of the optical thicknesses of the individual polymer layers that make up the optical repeating unit. $D_r$, therefore, is one half lambda in thickness, where lambda is the wavelength of the first order reflection peak. In general, the reflectance peak has finite band width, which increases with increasing index difference. By varying the optical thickness of the optical repeating units along the thickness of the multilayer film, a multilayer film can be designed that reflects light over a broad band of wavelengths. This band is commonly referred to as the reflection band or stop band. The collection of layers resulting in this band is commonly referred to as a multilayer stack. Thus, the optical thickness distribution of the optical repeat units within the multilayer film is manifested in the reflection and transmission spectra of the film. When the index matching is very high in the pass direction, the pass state transmission spectrum can be nearly flat and over 95% in the desired spectral range.

The multilayer reflective polarizing films useful in the present disclosure may include thickness distributions that include one or more band packets. A band packet is a multilayer stack having a range of layer thickness such that a wide band of wavelengths is reflected by the multilayer stack. For example, a blue band packet may have an optical thickness distribution such that it reflects blue light, i.e., approximately 400 nm to 500 nm. Multilayer reflective polarizing films of the present disclosure may include one or more band packets each reflecting a different wavelength band, e.g., a multilayer reflective polarizer having a red, a green, and a blue packet. Multilayer reflective polarizing films useful in the present disclosure may also include UV and/or IR band packets as well. In general, blue packets include optical repeat unit thicknesses such that the packet tends to reflect blue light and, therefore, will have optical repeat unit thicknesses that are less than the optical repeat unit thicknesses of the green or red packets. The band packets can be separated within a multilayer reflective polarizing film by one or more internal boundary layers.

One embodiment of the present disclosure may include a PBS having substantially right angle triangular prisms used to form a cube. In this case, the multilayer reflective polarizing film(s) are sandwiched between the hypotenuses of the two prisms, as described herein. A cube-shaped PBS may be preferred in many projection systems because it provides for a compact design, e.g., the light source and other components, such as filters, can be positioned so as to provide a small, light-weight, portable projector.

Although a cube is one embodiment, other PBS shapes can be used. For example, a combination of several prisms can be assembled to provide a rectangular PBS. For some systems, the cube-shaped PBS may be modified such that one or more faces are not square. If non-square faces are used, a matching, parallel face can be provided by the next adjacent component, such as the color prism or the projection lens.

The prism dimensions, and the resulting PBS dimensions, depend upon the intended application. In an illustrative three panel liquid crystal on silicon (LCoS) light engine described herein in reference to FIG. 3, the PBS can be 17 mm in length and width, with a 24 mm height when using a small arc high pressure Hg type lamp, such as the UHP type sold commercially by Philips Corp. (Aachen, Germany), with its beam prepared as an f/2.3 cone of light and presented to the PBS cubes for use with 0.7 inch diagonal imagers with 16:9 aspect ratio, such as the imagers available from JVC (Wayne, N.J., USA), Hitachi (Fremont, Calif., USA), or Three-Five Systems (Tempe, Ariz., USA). The f# of the beam and imager size are some of the factors that determine the PBS size.

A multilayer reflective polarizing PBS assembly can be formed by the following method. A cross-linkable silicone layer can be disposed (coated or laminated, for example) between a multilayer reflective polarizing film and a rigid cover. The cross-linkable silicone layer can be disposed (coated or laminated, for example) on either the multilayer reflective polarizing film or the rigid cover. The cross-linkable silicone can be cured with heat or light to from a cross-linked silicone gel layer. Laminating or coating the cross-linkable silicone layer on the multilayer reflective polarizing film and/or the rigid cover can, in some embodiments, prevent noticeable air voids from forming between the cross-linked silicone gel layer and the multilayer reflective polarizing film and/or rigid cover. A second rigid cover can be disposed adjacent the multilayer reflective polarizing film such that the multilayer reflective polarizing film is disposed between the two rigid covers. A second cross-linkable or cross-linked silicone layer can be disposed between the multilayer reflective polarizing film and the second rigid cover. In many embodiments, two or more multilayer reflective polarizing films can be included within the PBS assembly, as desired.

The above PBS assembly can also be formed using a cured, or cross-linked silicone gel material. In many embodiments, the cross-linked or cross-linkable silicone layer can be fluid enough such that it flows and can be pressed between the multilayer reflective film and/or the rigid cover. In some embodiments, a cross-linked silicone gel material can be combined with a silicone oil mixture, as described herein.

A single imager may be used for forming a monochromatic image or a color image. Multiple imagers are typically used for forming a color image, where the illuminating light is split into multiple beams of different color. An image is imposed on each of the beams individually, and these beams are then recombined to form a full color image.

Figure 3:
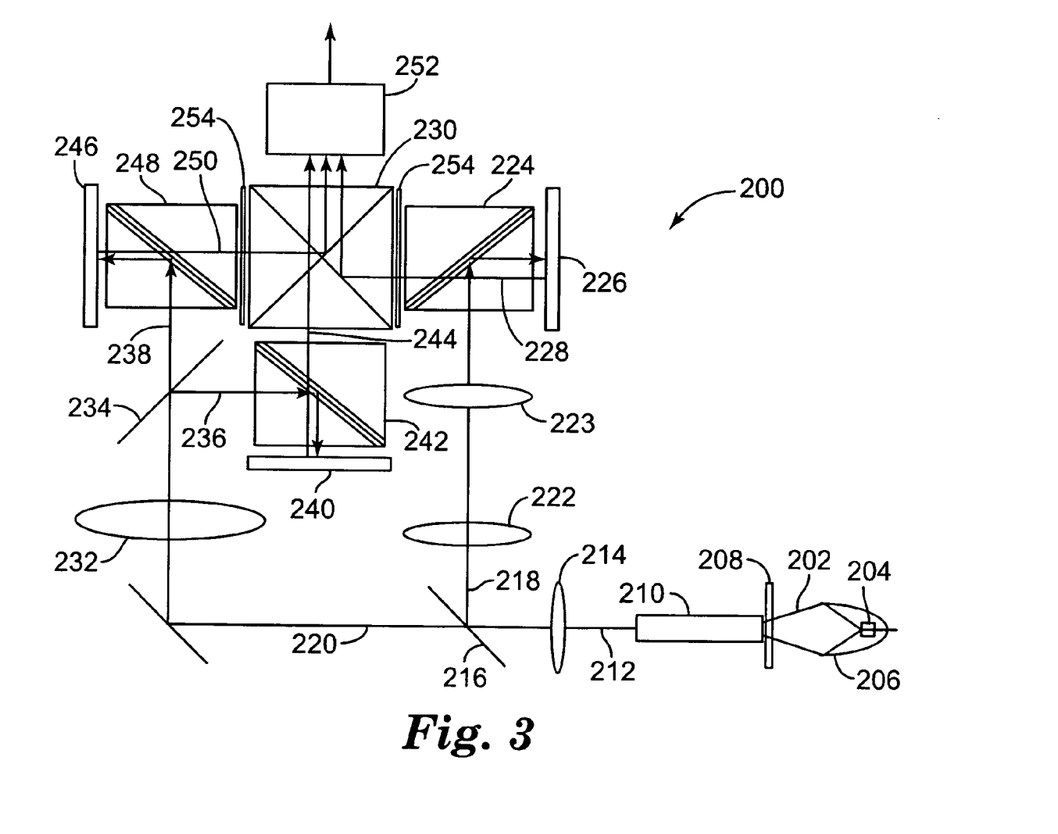
FIG. 3 schematically illustrates another embodiment of a projection unit based on multiple reflective imagers.

An embodiment of a multi-imager projection system 200 is schematically illustrated in FIG. 3. Light 202 is emitted from a source 204. The source 204 may be an arc or filament lamp, or any other suitable light source for generating light suitable for projecting images. The source 204 may be surrounded by a reflector 206, such as an elliptic reflector (as shown), a parabolic reflector, or the like, to increase the amount of light directed towards the projection engine.

The light 202 is typically treated before being split into different color bands. For example, the light 202 may be passed through an optional pre-polarizer 208, so that only light of a desired polarization is directed towards the projection engine. The pre-polarizer may be in the form of a reflective polarizer, so that reflected light, in the unwanted polarization state, is redirected to the light source 204 for re-cycling. The light 202 may also be homogenized so that the imagers in the projection engine are uniformly illuminated. One approach to homogenizing the light 202 is to pass the light 202 through a reflecting tunnel 210, although it will be appreciated that other approaches to homogenizing the light may also be employed.

In the illustrated embodiment, the homogenized light 212 passes through a first lens 214 to reduce the divergence angle. The light 212 is then incident on a first color separator 216, which may be, for example, a dielectric thin film filter. The first color separator 216 separates light 218 in a first color band from the remaining light 220.

The light 218 in the first color band may be passed through a second lens 222, and optionally a third lens 223, to control the size of the light beam 218 in the first color band incident on the first PBS 224. The light 218 passes from the first PBS 224 to a first imager 226. The imager reflects image light 228 in a polarization state that is transmitted through the PBS 224 to an x-cube color combiner 230. The imager 226 may include one or more compensation elements, such as a retarder element, to provide additional polarization rotation and thus increase contrast in the image light.

The remaining light 220 may be passed through a fourth lens 232. The remaining light 220 is then incident on a second color separator 234, for example a thin film filter or the like, to produce a beam 236 in a second color band and a light beam 238 in a third color band. The tight 236 in the second color band is directed to a second imager 240 via a second PBS 242. The second imager 240 directs image light 244 in the second color band to the x-cube color combiner 230.

The light 238 in the third color band is directed to a third imager 246 via a third PBS 248. The third imager 246 directs image light 250 in the third color band to the x-cube color combiner 230.

The image light 228, 244 and 250 in the first, second and third color bands is combined in the x-cube color combiner 230 and directed as a full color image beam to projection optics 252. Polarization rotating optics 254, for example half-wave retardation plates or the like, may be provided between the PBSs 224, 242 and 248 and the x-cube color combiner 230 to control the polarization of the light combined in the x-cube color combiner 230. In the illustrated embodiment, polarization rotating optics 254 are disposed between the x-cube color combiner 230 and the first PBS 224 and third PBS 248. Any one, two, or all three of PBSs 224, 242, and 248 may include one or more multilayer reflective polarizing films as described herein.

It will be appreciated that variations of the illustrated embodiment may be used. For example, rather than reflect light to the imagers and then transmit the image light, the PBSs may transmit light to the imagers and then reflect the image light. The above described projection systems are only examples; a variety of systems can be designed that utilize the multifilm PBSs of the present disclosure.

EXAMPLES

The multilayer reflective polarizing films of the following examples are similar in construction and processing. The films were extruded and drawn in accordance with the general methods described in U.S. Pat. No. 6,609,795 and in accordance with the general methods described in U.S. Patent Publication 2004-0227994.

PBS assemblies were built and then tested in a light engine designed for a rear projection TV. A plain mirror for the dark state and a mirror with a ¼ wave film for the bright state were used as the imagers. The light engine projected the image onto a Fresnel/screen assembly.

After the PBS reached a thermal steady state of less than 35 degrees Celsius, an image of the transmission state (bright state) was shown onto the screen and the brightness was measured using a Prometric PM Series imaging colorimeter available from Radiant Imaging (Duvall, Wash.) throughout the image. Then the same was done for the block state (dark state flux).

Contrast, defined as the brightness in bright state flux divided by the brightness of the dark state flux, was calculated throughout the image of each assembly. Stress induced birefringence was usually seen as "bright corners" in the dark state flux, lowering the contrast in those areas to unacceptable levels.

The contrast of a PBS can be tested with reference to FIG. 1, with the imager 26 replaced with a quarter wave film laminated to the front surface of a mirror. When the quarter wave film on a mirror is oriented with its optical axis at 45° to the polarization direction of the central ray of the illuminating beam it will function like a half wave film oriented at 45° to a transmitted polarized beam: i.e., it will rotate the polarization direction of the beam by 90°. Because of the previously described function of the PBS, this will result in substantially all of the light that is reflected off the quarter wave film/mirror being projected through lens 28 onto the screen. If the quarter wave film is instead oriented at 0° to the polarization state of the central ray, it will behave like a half wave film oriented with the polarization state of a transmitted beam of light and leave the polarization direction of the beam unchanged. This will result in substantially all of the light being directed back toward the light source by the PBS, without being projected to the screen by lens 28.

To measure the contrast ratio of the PBS, the bright state flux through the projection lens 28 is first characterized by orienting the quarter wave film/mirror optical axis at 45 degrees to the polarization direction of the central ray of the illuminating beam of light. This flux can be characterized by measuring illuminance of the beam at a fixed distance from the lens 28, by collecting all the projected light into an integrating sphere with a calibrated photodiode, or by other means available to those skilled in the art. The dark state is then produced by orienting the quarter wave film so that its optical axis is aligned with the polarization state of the central ray of the illuminating beam. The flux through lens 28 resulting from this state is then measured by the same technique used for characterizing the bright state flux. The ratio of bright state flux to dark state flux provides one measure of the contrast ratio, or the quarter wave film contrast ratio.

Contrast was deemed acceptable if the minimum contrast on an image was greater than 1500. The results below show that only oils or very weak gels can be used as an "adhesive" to obtain acceptable minimum contrast levels. The gel and oil mixture is representative of a weak gel. Phenylmethylsilicones were used to roughly match the refractive indexes of the other assembly materials.

The length, width, and height measurements of a PBS assembly in the examples below were 32 mm, 32 mm, and 44 mm respectively. The constructions consisted of two multilayer reflective polarizing films sandwiched between SK5 glass prisms, using an adhesive (or in one case, an oil) at each internal interface. The method of PBS assembly was similar for each example. Adhesive was first applied to the hypotenuse of a right angle prism. A first multilayer reflective polarizing film was placed on that adhesive material. A second amount of adhesive was applied to the air side of the first multilayer reflective polarizing film and then a second multilayer reflective polarizing film was placed on that second adhesive material. A third amount of adhesive material was applied to the air side of the second multilayer reflective polarizing film. Finally, a second, matching prism was placed on the third adhesive and pressure was applied until the adhesive had spread between all internal interfaces of the assembly, eliminating pockets of air. The adhesive was then cured as required. In the case of the oil, limiting the relative motion of the two prisms (by taping the edges) structurally stabilized the assembly.

Table 1 below illustrates the testing results.

TABLE 1

| Material | Consistency | Minimum Contrast | Pass/Fail |
|---|---|---|---|
| Acrylic UV Cured Adhesive | Stiff | <<1500 | Fail |
| Epoxy Thermal Cured Adhesive | Stiff | <<1500 | Fail |
| Phenylmethyl silicone Gel | Gel | <1500 | Fail |
| Phenylmethyl silicone Oil | Oil | >>1500 | Pass |
| Phenylmethyl silicone Gel:Oil 30:70 weight ratio | Weak gel | >>1500 | Pass |

All references and publications cited herein are expressly incorporated herein by reference in their entirety into this disclosure. Illustrative embodiments of this disclosure are discussed and reference has been made to possible variations within the scope of this disclosure. These and other variations and modifications in the disclosure will be apparent to those skilled in the art without departing from the scope of this disclosure, and it should be understood that this disclosure is not limited to the illustrative embodiments set forth herein. Accordingly, the disclosure is to be limited only by the claims provided below.

What is claimed is:

1. A polarizing beam splitter, comprising:
   a multilayer polarizing film;
   a first cross-linked silicone gel layer disposed on the multilayer polarizing film;
   a first rigid cover disposed on the first cross-linked silicone gel layer;
   a second rigid cover disposed adjacent to the multilayer polarizing film; and
   a second cross-linked silicone gel layer disposed between the second rigid cover and the multilayer polarizing film, the second cross-linked silicone gel layer comprising cross-linked phenylmethylsilicone and phenylmethylsilicone oil.

2. A polarizing beam splitter according to claim 1, wherein the second cross-linked silicone gel layer has a thickness in a range from 0.5 to 150 micrometers.

3. The polarizing beam splitter according to claim 1, wherein the multilayer polarizing film is a polymeric multilayer reflective polarizing film.

4. A polarizing beam splitter according to claim 1, wherein the first cover is a prism and the second cover is a prism.

5. A polarizing beam splitter according to claim 1, wherein the first cover is a glass prism and the second cover is a glass prism.

6. A polarizing beam splitter according to claim 1, wherein the multilayer polarizing film is a multilayer polyester polarizing film.

7. A polarizing beam splitter according to claim 1, wherein the multilayer polarizing film is a multilayer reflective polarizing film.

8. The polarizing beam splitter according to claim 7, wherein the multilayer polarizing film is a polymeric multilayer polarizing film.

9. A polarizing beam splitter according to claim 1, wherein the multilayer polarizing film is a matched z-index multilayer reflective polarizing film.

10. A polarizing beam splitter according to claim 1, wherein the first cross-linked silicone gel layer comprises a cross-linked silicone gel layer having a refractive index in a range from 1.50 to 1.58.

11. A polarizing beam splitter according to claim 1, wherein the first cross-linked silicone gel layer comprises cross-linked phenylmethylsilicone.

12. A polarizing beam splitter according to claim 11, wherein the first cross-linked silicone gel layer comprises cross-linked phenylmethylsilicone and phenylmethylsilicone oil.

13. A polarizing beam splitter according to claim 1, wherein the first cross-linked silicone gel layer has a thickness in a range from 0.5 to 150 micrometers.

14. A polarizing beam splitter according to claim 1, wherein the second cross-linked silicone gel layer comprises a cross-linked silicone gel layer having a refractive index in a range from 1.5 to 1.6.

15. A method of making a polarizing beam splitter, the method comprising:
   disposing a multilayer reflective polarizing film between a first rigid cover and a second rigid cover, wherein a first cross-linked silicone gel layer is between the multilayer reflective polarizing film and the first cover and a second cross-linked silicone gel layer is between the multilayer reflective polarizing film and the second cover, and wherein the second cross-linked silicone gel layer comprises cross-linked phenylmethylsilicone and phenylmethylsilicone oil.

16. A method according to claim 15, further comprising curing a first silicone material to form a first cross-linked silicone gel layer prior to the disposing a multilayer reflective polarizing film between a first rigid cover and a second rigid cover step.

17. A method according to claim 15, further comprising curing a first silicone material to form a first cross-linked silicone gel layer, after the disposing a multilayer reflective polarizing film between a first rigid cover and a second rigid cover step.

18. A method according to claim 15, further comprising curing a first silicone material to form a first cross-linked silicone gel layer and curing a second silicone material to form a second cross-linked silicone gel layer, prior to the disposing a multilayer reflective polarizing film between a first rigid cover and a second rigid cover step.

19. A method according to claim 15, further comprising curing a first silicone material to form a first cross-linked silicone gel layer and curing a second silicone material to form a second cross-linked silicone gel layer, after the disposing a multilayer reflective polarizing film between a first rigid cover and a second rigid cover step.

20. A method according to claim 15, further comprising combining a silicone oil with a cross-linked silicone gel to form a first cross-linked silicone gel layer.

21. A method according to claim 15, further comprising combining a silicone oil with a cross-linked silicone gel to form the first cross-linked silicone gel layer and the second cross-linked silicone gel layer.

* * * * *

UNITED STATES PATENT AND TRADEMARK OFFICE
CERTIFICATE OF CORRECTION

PATENT NO.        : 7,315,418 B2                                    Page 1 of 1
APPLICATION NO. : 11/095434
DATED             : January 1, 2008
INVENTOR(S)       : James P. DiZio It is certified that error appears in the above-identified patent and that said Letters Patent is hereby corrected as shown below:

Column 9
Line 20, delete "tight" and insert -- light --, therefor.

Signed and Sealed this

Seventeenth Day of June, 2008

JON W. DUDAS
*Director of the United States Patent and Trademark Office*